(12) United States Patent
Engdahl

(10) Patent No.: US 8,020,879 B1
(45) Date of Patent: Sep. 20, 2011

(54) BACKPACK CONVERTIBLE TO A BABY STROLLER

(76) Inventor: Kenneth C. Engdahl, Stockton, CA (US)

( * ) Notice: Subject to any disclaimer, the term of this patent is extended or adjusted under 35 U.S.C. 154(b) by 411 days.

(21) Appl. No.: 12/383,781

(22) Filed: Mar. 26, 2009

Related U.S. Application Data

(60) Provisional application No. 61/070,679, filed on Mar. 26, 2008.

(51) Int. Cl.
*B60N 2/28* (2006.01)

(52) U.S. Cl. ............... 280/30; 280/643; 280/648

(58) Field of Classification Search .......... 280/30, 280/37, 47.25, 47.28, 643, 644, 647, 648, 280/649, 650, 657, 658; 297/130
See application file for complete search history.

(56) References Cited

U.S. PATENT DOCUMENTS

| | | | | |
|---|---|---|---|---|
| 4,157,839 A | * | 6/1979 | Lahti et al. | 280/642 |
| 4,487,428 A | * | 12/1984 | Harada et al. | 280/648 |
| 4,586,721 A | * | 5/1986 | Harada et al. | 280/30 |
| 4,747,526 A | * | 5/1988 | Launes | 224/155 |
| 4,762,256 A | * | 8/1988 | Whitaker | 224/161 |
| 4,768,795 A | * | 9/1988 | Mar | 280/30 |
| 5,290,049 A | * | 3/1994 | Crisp et al. | 280/30 |
| D357,438 S | * | 4/1995 | Hsia | D12/129 |
| 5,564,720 A | | 10/1996 | Stringer | |
| 5,573,166 A | * | 11/1996 | Leja | 224/630 |
| 5,626,271 A | * | 5/1997 | Messey et al. | 224/161 |
| 5,662,339 A | * | 9/1997 | Svendsen et al. | 280/30 |
| 5,803,470 A | | 9/1998 | Smith | |
| D408,335 S | * | 4/1999 | Eyman et al. | D12/129 |
| 5,956,766 A | * | 9/1999 | Benway | 2/69 |
| 5,964,470 A | * | 10/1999 | Syendsen et al. | 280/30 |
| 6,155,579 A | * | 12/2000 | Eyman et al. | 280/30 |
| 6,158,641 A | * | 12/2000 | Eyman et al. | 224/577 |
| 6,378,892 B1 | | 4/2002 | Hsia | |
| 6,460,866 B1 | * | 10/2002 | Altschul et al. | 280/30 |
| 6,915,933 B2 | * | 7/2005 | Costa et al. | 224/576 |
| 7,293,792 B2 | * | 11/2007 | Wilson | 280/647 |
| 2002/0140260 A1 | * | 10/2002 | Osato | 297/217.4 |
| 2004/0145133 A1 | * | 7/2004 | Lee | 280/30 |
| 2005/0017039 A1 | * | 1/2005 | Costa et al. | 224/576 |
| 2005/0161893 A2 | * | 7/2005 | Darling | 280/30 |
| 2006/0180421 A1 | * | 8/2006 | Godshaw et al. | 190/18 A |
| 2006/0232046 A1 | * | 10/2006 | Faber | 280/647 |
| 2008/0042379 A1 | * | 2/2008 | Amran | 280/30 |
| 2008/0061096 A1 | * | 3/2008 | Mancuso | 224/409 |
| 2009/0066045 A1 | * | 3/2009 | Turner et al. | 280/30 |
| 2010/0301587 A1 | * | 12/2010 | Gilbertson et al. | 280/650 |
| 2011/0074124 A1 | * | 3/2011 | Schnarr et al. | 280/30 |

* cited by examiner

*Primary Examiner* — J. Allen Shriver, II
*Assistant Examiner* — Brodie Follman
(74) *Attorney, Agent, or Firm* — Robert C. Montgomery

(57) ABSTRACT

A child's stroller that collapses into a compact form that can be carried in a manner similar to a backpack is herein disclosed. When collapsed, an attached textile-based covering or bag is wrapped over the stroller portion and secured shut with a zipper. Adjustable straps are then placed over the parent's or caregiver's shoulders, thereby allowing the apparatus to be carried in a backpack manner. In such a manner, the stroller may be collapsed and carried when the stroller is not needed on a continual basis. As such, the parent or care provider may enjoy the convenience of a stroller when needed, but is not burdened with pushing or caring the stroller when the child is not in it.

16 Claims, 4 Drawing Sheets

BACKPACK CONVERTIBLE TO A BABY STROLLER

RELATED APPLICATIONS

The present invention was first described in and claims the benefit of U.S. Provisional Application No. 61/070,679, filed on Mar. 26, 2008, the entire disclosures of which are incorporated herein by reference.

FIELD OF THE INVENTION

The present invention relates generally to a children's stroller and, more particularly, to a children's stroller that is collapsible and convertible into a backpack.

BACKGROUND OF THE INVENTION

Many people utilize a baby stroller to carry their child while they are walking. As children grow older, they typically will walk for a short period of time and then wish to ride in the stroller. This forces the parent or care provider to bring a stroller with them on all outings and add the burden of pushing an empty stroller, whether it is needed or not. Having to push an empty stroller and keep control of a walking toddler can be overwhelming for parents. Collapsible strollers while occupying less space when not in use do not solve this problem and can even exacerbate the problem since the parent must carry the collapsed stroller causing additional fatigue. In addition to keeping track of a stroller and a small child, during most outings parents need to bring a variety of child care and entertainment items along. These additional items normally require another bag or carrying device. Various devices have attempted to solve these problems consisting basically of familiar structures and in expected manners.

Various attempts have been made in the past to overcome these disadvantages and provide a means of transporting children and related times without the aforementioned problems. Among the relevant attempts to address these problems are several U.S. Pat. Nos., including 4,747,526; 5,564,720; 5,662,339; 5,803,470 and 6,378,892.

U.S. Pat. No. 5,964,470, issued in the name of Syendsen et al., describes a child carrier for use as a two-wheeled stroller and as a child-supporting backpack comprising an inverted "U"-shaped frame, an upper handle, a lower leg portion with two (2) wheels, a coupling bracket, and shoulder straps. The Syendsen device provides a partially collapsible stroller having an alternate child carrying means comprising an over the shoulder child carrier.

U.S. Pat. No. 6,155,579, issued in the name of Eyman et al., describes a folding child stroller and frame which is convertible from use as a ground-contacting wheeled stroller and a over the shoulder frame for carrying a child on a person's back. The Eyman device comprises a front and rear frame portion, front and real wheels, a child holder, and a pivot point between the front and rear frame which enables the configuration conversion.

U.S. Pat. No. 6,915,933, issued in the name of Costa et al., describes a portable apparatus for carrying a stroller comprising a sack having open top and bottom ends which receives a collapsed child's stroller, a plurality of straps for securing the stroller, and adjustable straps which enable the device to be positioned and worn on a person's back.

While these devices fulfill their respective, particular objectives, each of these references suffers from one (1) or more of the aforementioned disadvantages. Accordingly, the present invention substantially departs from the conventional solutions and in doing so provides a means by which the comfort and convenience of a child's stroller can be provided for a child beginning to walk, yet be easily transportable when it is not needed. Accordingly, it can be appreciated that there exists a need for a backpack which is convertible to a children's stroller. The development of the invention herein described fulfills this need.

SUMMARY OF THE INVENTION

In view of the foregoing references, the inventor recognized the aforementioned inherent problems and observed that there is a need for backpack which is convertible to a children's stroller and thus, the object of the present invention is to solve the aforementioned disadvantages.

To achieve the above objectives, it is an object of the apparatus to provide a backpack convertible to a children's stroller which provides a means for a child's stroller to collapse into a compact flat structure which may be carried in a manner similar to a backpack using a containing cover. When collapsed, an attached textile-based cover is wrapped over a stroller assembly and is secured shut with a zipper fastener. A pair of adjustable shoulder straps can then be placed over a parent or caregiver's shoulders which enables the stroller to be carried in a backpack-like arrangement.

Another object of the apparatus is to provide an apparatus comprising a stroller assembly, a seat, a sunshade, a storage net, four fasteners, a cover, a pair of first side storage compartments, a pair of second side storage compartments, and a pair of third side storage compartments.

Yet still another object of the apparatus is to provide the stroller assembly comprising expected elements and features associated with a conventional stroller such as a collapsible tubular frame, a push handle, a pair of push handle hinges, a seat, a harness, four wheel assemblies, and a sunshade.

Yet still another object of the apparatus is to provide the frame comprising a lower rail portion, a pair of hinges, a lower rail stiffener, a pair of vertices, an upper rail portion, an upper rail stiffener, and a plurality of tube locking collars.

Yet still another object of the apparatus is to provide the stroller frame comprising the pair of vertices which provide a means to fold the wheels inward toward each other and the plurality of telescoping and folding tubular frame members. The telescoping tubular frame members are collapsed, extended, and held securely in position via respective locking collars.

Yet still another object of the apparatus is to provide the stroller frame comprising a pair of locking mechanisms at opposing positions adjacent to a telescoping push handle along the tubular frame members which provides a means to secure the extended position of the push handle and the interconnected tubular frame members when the stroller is in a fully deployed state.

Yet still another object of the apparatus is to provide the lower rail portion and the lower rail stiffener which provide a lateral locking means between the parallel frame members when in a deployed state. The lower rail portions are attached to each lower front portion of the frame above a front wheel assembly and the lower rail stiffener is centrally located between both hinges.

Yet still another object of the apparatus is to provide the upper rail portion and the upper rail stiffener which provide a lateral locking means between the parallel vertices when in a deployed state. The upper rail portion is attached to each vertex above a lower seat portion and is centrally located between both vertices.

Yet still another object of the apparatus is to provide the locking collars comprising threaded friction devices similar to those used on photographic tripods used to secure a relative position of two telescoping tubular frame members.

Yet still another object of the apparatus is to provide the seat comprising a common adjustable harness and a harness buckle which secures the infant or child. The harness is connected to the upper portion of the seat and is suspended downwardly to encompass the infant's chest portion. The harness is also connected thereto the lower seat portion at the infant's leg region. The harness interconnects to the buckle by a common digit release fastening feature. The harness also comprises a pair of length adjustments which are located on each shoulder portion.

Yet still another object of the apparatus is to provide the cover comprising a large cover flap and a cover zipper. When the stroller assembly is expanded and deployed, the cover is positioned along a rear portion of the stroller assembly and compactly secured to the tubular frame members using a fastening means.

Yet still another object of the apparatus is to provide the cover comprises a pair of conventional backpack-type shoulder straps which are sewn on the upper and lower seams along a forward facing portion of the cover. Each shoulder strap comprises a length adjustment means.

Yet still another object of the apparatus is to provide the cover comprising a plurality of extended side storage compartments located along both side portions. The side storage compartments provide a variety of sized and shaped enclosures for storing items such as, diapers, wipes, water, cell phones, and the like. Each side storage compartment comprises a side storage compartment zipper to secure the contents.

Yet still another object of the apparatus is to provide the sunshade comprising a sunshade frame which is a "U"-shaped rod sewn-into the sunshade. The rod-type sunshade frame provides a removably detachable insertion means into particular opposing tubular frame members which are subjacent to the push handle.

Yet still another object of the apparatus is to provide a method of utilizing the backpack convertible to children's stroller which provides the convenience of a stroller when needed but is not the unnecessary burden of pushing or caring an empty stroller when a child is not occupying it in a comfortable backpack-like carrying configuration in a manner which is quick, easy, and effective.

Further objects and advantages of the apparatus will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
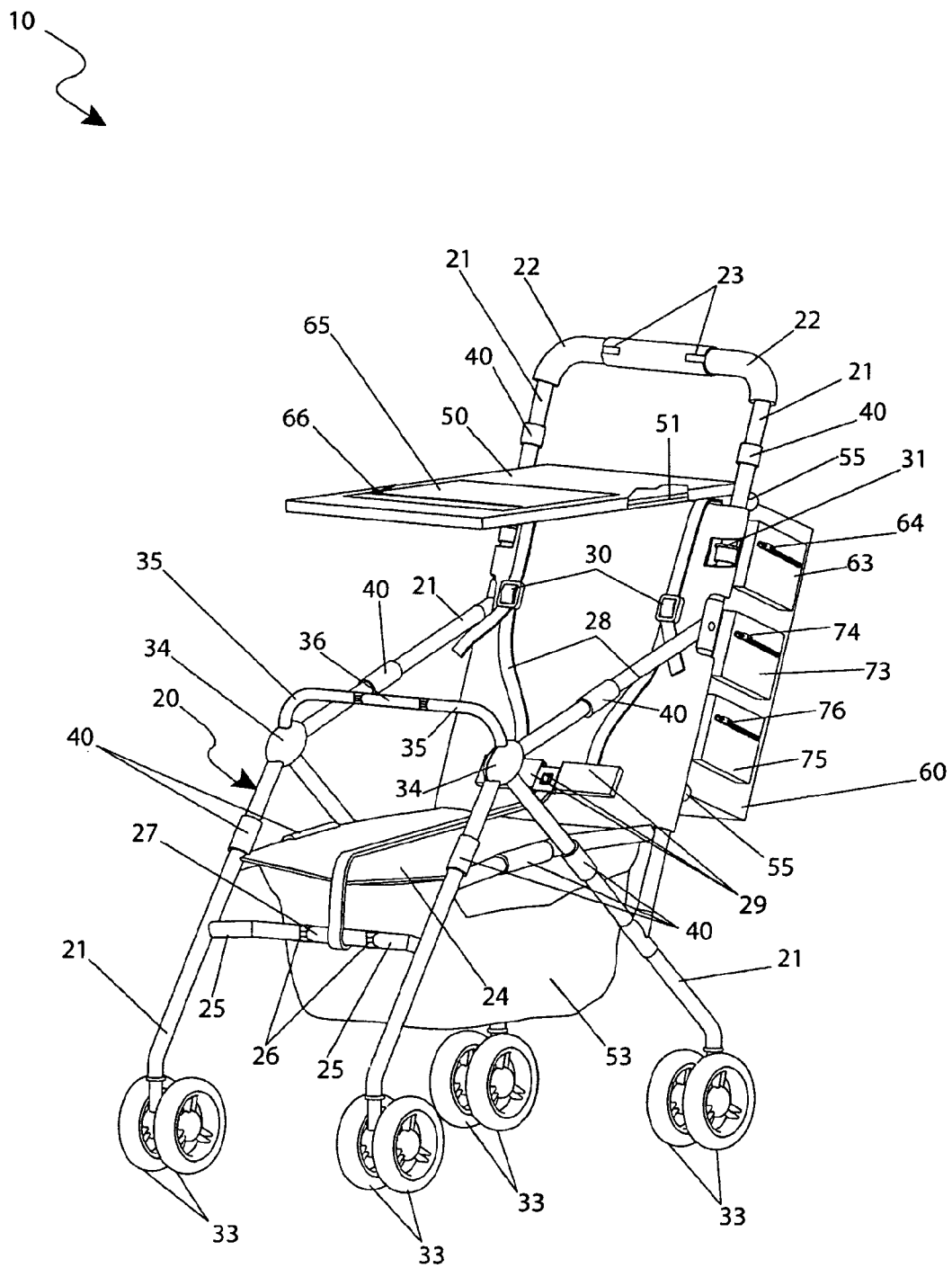
FIG. 1 is a front perspective view of a backpack convertible to children's stroller 10 depicting an open state therewith cut-away portion, according to a preferred embodiment of the present invention.

| | |
|---|---|
| 10 | backpack convertible to children's stroller |
| 20 | stroller assembly |
| 21 | frame |
| 22 | push handle |
| 23 | push handle hinge |
| 24 | seat |
| 25 | lower rail portion |
| 26 | hinge |
| 27 | lower rail stiffener |
| 28 | harness |
| 29 | harness buckle |
| 30 | harness length adjustment means |
| 31 | locking mechanism |
| 33 | wheel assembly |
| 34 | vertex |
| 35 | upper rail portion |
| 36 | upper rail stiffener |
| 40 | locking collar |
| 50 | sunshade |
| 51 | sunshade frame |
| 53 | storage net |
| 55 | fastener |
| 60 | cover |
| 61 | cover flap |
| 62 | cover zipper |
| 63 | first side storage compartment |
| 64 | first side storage compartment zipper |
| 65 | first storage compartment |
| 66 | first storage compartment zipper |
| 67 | second storage compartment |
| 68 | second storage compartment zipper |
| 73 | second side storage compartment |
| 74 | second side storage zipper |
| 75 | third side storage compartment |
| 76 | third side storage zipper |
| 80 | adjustable shoulder strap |
| 81 | shoulder strap length adjustment means |
| 100 | adult |

DETAILED DESCRIPTION OF THE PREFERRED EMBODIMENT

The best mode for carrying out the invention is presented in terms of its preferred embodiment, herein depicted within FIGS. 1 through 3B. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a backpack convertible to a children's stroller (herein described as the "apparatus") 10, which provides a means for a child's stroller 20 to collapse into a compact flat structure approximately twenty-four (24) inches high and may be carried in a manner similar to a backpack using a containing cover 60. When collapsed, the attached textile-based cover 60 is wrapped over the stroller assembly 20 and secured shut with a zipper 62. A pair of adjustable shoulder straps 80 is then placed over the parent or caregiver's 100 shoulders allowing the stroller 20 to be carried in a backpack arrangement. In such a manner, the parent or caregiver 100 is provided the convenience of a stroller 20 when needed but is not unnecessarily burdened with pushing or caring it when a child is not occupying it.

Referring now to FIG. 1, a front perspective view of the apparatus 10 depicting an open state therewith cut-away portion, according to the preferred embodiment of the present invention, is disclosed. The apparatus 10 comprises a stroller assembly 20, a storage net 53, four (4) fasteners 55, a cover 60, a pair of first side storage compartments 63, a pair of second side storage compartments 73, and a pair of third side storage compartments 75. The stroller assembly 20 comprises expected elements and features associated with conventional strollers such as a collapsible tubular frame 21, a push handle 22, a pair of push handle hinges 23, a seat 24, a harness 28, four (4) wheel assemblies 33, and a sunshade 50. The frame 21 comprises a lower rail portion 25, a pair of hinges 26, a lower rail stiffener 27, a pair of vertices 34, an upper rail portion 35, an upper rail stiffener 36, and a plurality of tube locking collars 40.

The frames 21 lower rail assembly is comprised of a the lower rail portion 25 and lower rail stiffener 27 which are comprised of linear metal devices with a pair of centrally-located hinges 26 which when pivoted form a straight member. The lower rail portion 25 and lower rail stiffener 27 provide a lateral locking means therebetween parallel frame members 21 when in a deployed state. The lower rail portions 25 are attached to each lower front portion of the frame 21 above a front wheel assembly 33 and the lower rail stiffener 27 is centrally located therebetween both hinges 26.

The frames 21 upper rail assembly is comprised of an upper rail portion 35 and upper rail stiffener 36 which are also comprised of linear metal devices which when pivoted form a straight member similar thereto the lower rail assembly. The upper rail portion 35 and upper rail stiffener 36 provide a lateral locking means therebetween parallel vertices 34 when in a deployed state. The upper rail portion 35 is attached to each vertex 34 above the lower seat 24 portion and are centrally located therebetween both vertices 34.

The frame 21 provides an attachment means thereto a conventional seat 24, a detachable sunshade 50, and a storage net 53. The seat 24 comprises an "L"-shaped textile panel providing comfortable and cradling bottom and rear containment of an occupying infant or child comprising a plurality of supporting attachments along adjacent tubular frame members 21 using common fasteners 55 in an expected manner.

The seat 24 is also provided therewith a common adjustable harness 28 and harness buckle 29 thereto secure the infant or child thereinto the apparatus 10. The harness 28 is connected thereto the upper portion of the seat 24 and is suspended downwardly thereto encompass the infants chest portion. The harness 28 is also connected thereto a lower sear 24 portion at the infants leg region. The harness 28 interconnects thereto the buckle 29 thereby common digit release fastening means. The harness 28 also comprises a pair of length adjustments 30 located on each shoulder portion. The harness 28 is fabricated from a nylon material, yet other materials may be incorporated therewithout limiting the function of the apparatus 10.

The seat 24 further provides an attached storage net 53 affixed thereto along three (3) side edges suspended therefrom the seat 24 comprising an open forward edge providing convenient storage of various child-care and personal items. The storage net 53 is fabricated using elastic nylon or polypropylene mesh webbing and being affixed thereto the seat 24 using adhesives, sewing techniques, rivets, or the like.

The sunshade 50 comprises a rectangular weather-resistant fabric panel being stretched taut when deployed via a sunshade frame 51 along perimeter edges, thereby providing protection to an occupant therefrom sunlight, rain, snow, and the like, in an expected manner. The sunshade frame 51 is a "U"-shaped tubular metal rod sewn-into the sunshade 50. The rod-type sunshade frame 51 portion of the sunshade 50 provides a removably detachable insertion thereinto particular opposing tubular frame members 21 being subjacent thereto the push handle 22 and is pivotingly deployed, stored, or completely removed if so desired. The sunshade 50 further comprises a first storage compartment 65 along an upper surface at a central position thereupon comprising a rectangular pouch being approximately eight (8) to twelve (12) inches on a side. The first storage compartment 65 also comprises a first storage compartment zipper 66 and is fabricated from similar materials and method of construction as the sunshade 50.

The frame 21 provides a permanent attachment means thereto a cover 60 via common fasteners 55 such as screws, rivets, or the like being affixed thereto tubular frame members 21 being subjacent thereto the push handle 22. The cover 60 provides a textile enclosure which deploys in a forward direction therearound the stroller assembly 20 providing a protective and attractive container thereto said stroller assembly 20 when in a collapsed state. The cover 60 further comprises a large cover flap 61 and a cover zipper 62 (see FIG. 3). When the stroller assembly 20 is expanded and deployed, the cover 60 is positioned along a rear portion of the stroller assembly 20 and compactly secured thereto said tubular frame members 21 using fastening means such as hook-and-loop straps, snaps, zippers, rubberized cords, or the like. The cover 60 yet further comprises a plurality of extended side storage compartments 63, 73, 75 located along both side portions. The side storage compartments 63, 73, 75 provide a variety of sized and shaped enclosures for storing items such as, but not limited to: diapers, wipes, water, cell phones, and the like. Each side storage compartment 63, 73, 75 also comprises a side storage compartment zipper 64, 74, 76 to secure said contents in an expected fashion. The cover 60 is illustrated here comprising a pair of opposing first side storage compartments 63, a pair of opposing second side storage compartments 73, and a pair of opposing third side storage compartments 75; however, it is understood that any number of side storage compartments 63, 73, 75 of various sizes and shapes may be provided and arranged thereupon the cover 60 without deviating from the concept and as such should not be interpreted as a limiting factor of the invention 10.

The cover 60, seat 24, sunshade 50, side storage compartments 63, 73, 75, and first storage compartments 65 are fabricated from rugged weather-resistant materials such as polyvinylchloride (PVC), canvas, CORDURA®, ballistic nylon, ripstop nylon, or the like, being assembled using conventional textile methods such as adhesives, welding, sewing, or the like. Said cover 60, seat 24, sunshade 50, side storage compartments 63, 73, 75, and first storage compartments 65 may also be provided in a variety of attractive colors, patterns, and textures.

Figure 2:
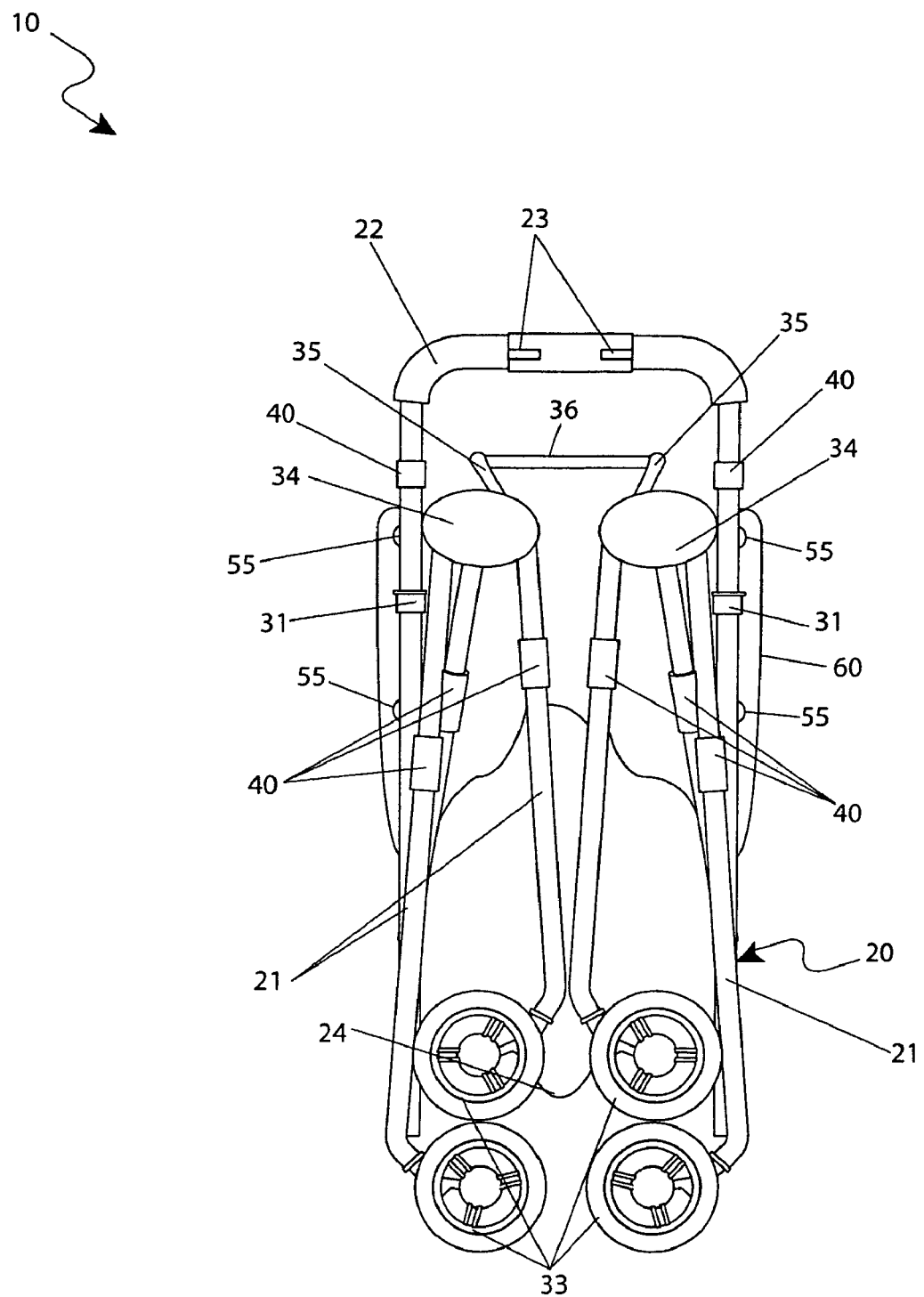
FIG. 2 is a front view of the backpack convertible to children's stroller 10 depicting a collapsed state, according to a preferred embodiment of the present invention.

Referring now to FIG. 2, a front view of the apparatus 10 depicting a collapsed state, according to the preferred embodiment of the present invention, is disclosed. The apparatus 10 comprises a stroller frame 21 which comprises a push handle 22, a pair of push handle hinges 23, a pair of locking mechanisms 31, four (4) wheel assemblies 33, and a plurality of tube locking collars 40. The stroller frame 21 folds and collapses for easy transporting and storage in a similar manner as common umbrella strollers; however, said frame 21 comprises additional size-reducing features allowing an overall length of approximately twenty-four (24) inches to be obtained, thereby enabling a user 100 to transport the apparatus 10 on an airplane as carry-on luggage. The frame 21 is fabricated from rugged lightweight materials such as aluminum tubing of various diameters.

The stroller frame 21 also utilizes the pair of vertices 34 which provide a means to fold the wheels 33 inward toward each other and a plurality of telescoping and folding tubular frame members 21. Said telescoping tubular frame members 21 are collapsed, extended, and held securely in position via respective locking collars 40 which provide a means of further compacting the frame 21. The locking collars 40 comprise threaded friction devices similar to those used on photographic tripods used to secure a relative position of two (2) telescoping tubular frame members 21 in an expected manner.

The stroller frame 21 further provides a pair of locking mechanisms 31 at opposing positions adjacent thereto a telescoping push handle 22 along subjacent tubular frame members 21 to secure an extended position of said push handle 22 and interconnected tubular frame members 21 when the stroller 20 in a fully deployed state. Said telescoping push handle 22 is collapsed, extended, and held securely in position via locking collars 40, thereby providing a means to further compact the apparatus 10. Each locking mechanism 31 locks the push handle 22 and interconnected tubular frame members 21 in position via an internal locking means such as, but not limited to: spring-loaded locking rods and holes within adjacent portions of the frame 21. However, it is understood that any number of locking mechanisms having various designs may be utilized to provided sufficient strength and stability thereto the frame 21 and as such should not be interpreted as a limiting factor of the apparatus 10.

Four (4) wheel assemblies 33 comprise commercially available plastic double wheel units providing common features such as independently rotating parallel plastic wheel sets, ball bearings, side locking levers, and the like. The wheel assemblies 33 provide removable attachment thereto the lower frame 21 via integral vertical metal shafts being inserted therein in an expected manner.

Figure 3A:
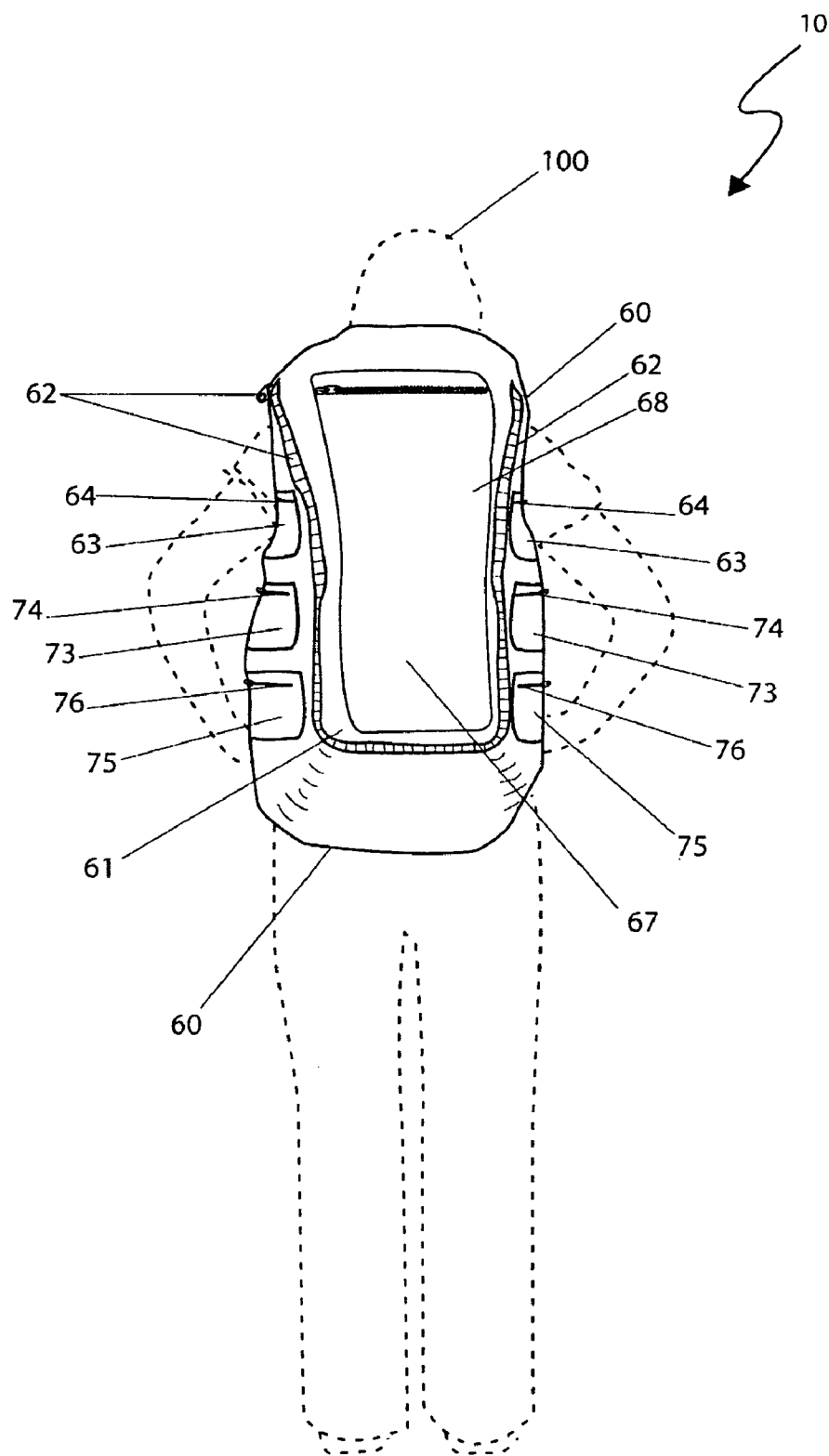
FIG. 3A is a rear view of the backpack convertible to children's stroller 10 depicting a stowed backpack state, according to a preferred embodiment of the present invention; and, FIG. 3B a front view of the backpack convertible to children's stroller 10 depicting a stowed backpack state, according to a preferred embodiment of the present invention.
Figure 3B:
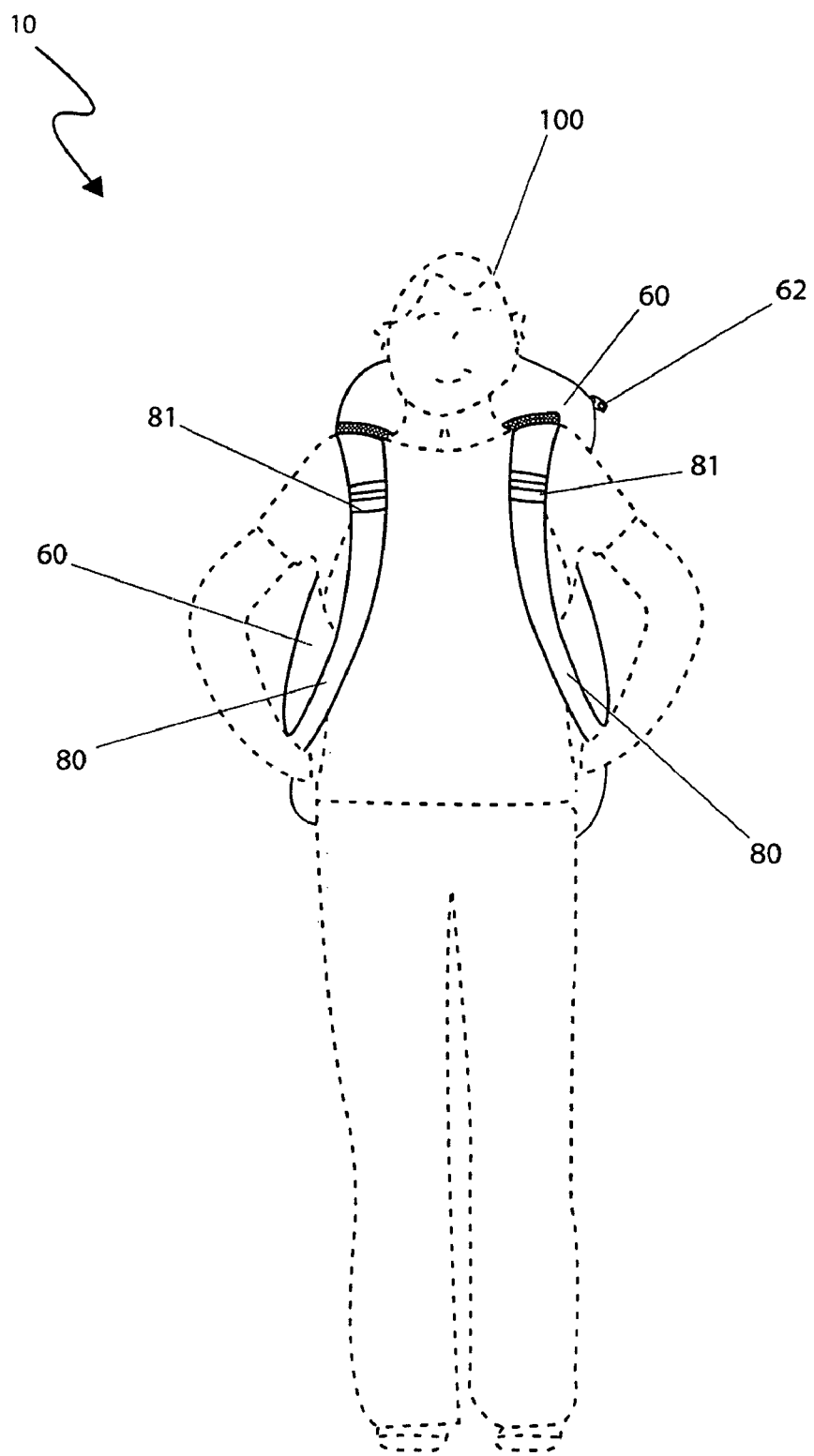

Referring now to FIG. 3A, a rear view and FIG. 3B, a front view of the apparatus 10 depicting a stowed backpack state according to the preferred embodiment of the present invention, are disclosed. The apparatus 10 comprises a cover 60, a cover flap 61, a cover zipper 62, a second storage compartment 67, a second storage compartment zipper 68, and a pair of shoulder straps 80. The cover 60 provides a generally rectangular encompassing enclosure thereto the stroller assembly 20 contained therewithin. The cover 60 provides a fastened attachment means thereto the tubular frame 21 providing flexible side panels which wrap around the stroller assembly 20 terminating along a rearward panel thereof providing an open rear surface. The cover 60 comprises an integral cover flap 61 being permanently affixed thereto said cover 60 along an upper portion and extending downwardly over said rear portion of the apparatus 10 providing an attachment means thereto side and lower portions of the cover 60 via a long cover zipper 61. The cover zipper 61 forms a "U"-shaped connection comprising a common commercially available heavy-duty device fabricated from a rugged plastic or metal material similar to those zipper devices used on backpacks, jackets, and the like.

The cover 60 also comprises a second storage compartment 67 comprising a rectangular pouch being approximately twelve (12) to sixteen (16) inches on a side and being located at a central position thereupon the cover flap 61. The second storage compartment 67 is fabricated from similar materials and methods of construction as the cover 60 and further comprises a second storage compartment zipper 68 along an upper edge in an expected manner.

Finally, the cover 60 further comprises a pair of conventional backpack-type nylon shoulder straps 80 being sewn thereto upper and lower seams along a forward facing portion of said cover 60 in an expected manner. Each shoulder strap 80 comprises a length adjustment means 81.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIGS. 1 through 3B.

The method of utilizing the apparatus 10 may be achieved by performing the following steps: acquiring the apparatus 10; unzipping the side storage compartment zippers 64, 74, 76; placing items such as cell phones, diapers, drinks or the like within the side storage compartments 63, 73, 75; closing the side storage compartments 63, 73, 75 using the side storage compartment zippers 64, 74, 76; placing the apparatus 10 on an adult's 100 back therewith the shoulder strap 80 portions of the cover 60 in like manner as any normal backpack configuration; adjusting the shoulder straps 80 to a desired length therewith each shoulder strap length adjustment means 81; and, carrying and using the apparatus 10 as a normal backpack until the stroller 20 configuration is required.

When the stroller 20 is required, the apparatus 10 may be utilized by performing the following steps: removing the cover portion 60 therefrom the adult 100 using the shoulder straps 80 in the same manner as a normal backpack; separating the cover 60 therefrom the cover flap 61 by unzipping the cover zipper 62; peeling back the cover 60 therefrom the stroller assembly 20 along side, top, and bottom areas; removing the stroller 20 therefrom the cover 60; positioning and securing the cover 60 thereto a rear area of the stroller assembly 20 using provided attachment means 55 such as hook-and-loop straps, snaps, or the like; releasing the telescoping locking collars 40; extending the stroller frame members 21 and push handle 22 to their full length by slidingly extending said frame members 21; securing the frame member 21 by rotating the telescoping locking collars 40; unfolding the stroller frame 21 such that the push handle 22 is extended and the locking mechanisms 31 are locked; pivoting the hinge portions 26 of the lower rail portion 25 and lower rail stiffener 27 and pivoting the vertices 34 of the upper rail portion 35 and upper rail stiffener 36 until both locked in place thereby securing the stroller 20 in the open position; unbuckling the harness buckle 29; raising the sunshade 50 into position; placing a child in to the stroller assembly 20; adjusting the harness 28 thereto snuggly fit the child therewith each of the harness length adjustment means 30 and buckling the harness buckle 29; and, utilizing the apparatus 10 as a stroller with an added benefit of having convenient access thereto the side storage compartments 63, 73, 75 and storage net 53.

When the stroller assembly 20 is no longer required, the apparatus 10 may be utilized by performing the following steps: unbuckling the harness buckle 29; removing the child from the apparatus 10; lowering the sunshade 50; removing the cover 60 from the fastener 55; unlocking the lower rail portion 25 and lower rail stiffener 27 using the included hinges 26; pulling the locking mechanisms 31 upward; folding the frame 21 thereto a collapsed state; releasing the telescoping locking collars 40; shortening the frame 21 and push handle 22 by slidingly moving the frame 21 members together; securing the telescoping locking collars 40; positioning the stroller assembly 20 therewithin the cover 60; closing the rear panel of the cover 60 by zipping the cover zipper 62; placing the apparatus 10 on the adult's 100 back using the adjustable shoulder straps 80 in the same manner as a normal backpack; and, carrying and using the apparatus 10 as a normal backpack until the stroller assembly 20 is again required.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A collapsible stroller assembly for being easily collapsed and supported on a user back during transport, said collapsible stroller assembly comprising:
   a collapsible tubular frame;
   a cover attached to a rear of said tubular frame; and,
   a cover flap pivotally coupled to said cover and being removably situated over said tubular frame while at a collapsed state such that said tubular frame is completely intercalated between said cover and said cover flap during transport;
   wherein said cover is deployed in a forward direction around said tubular frame while at the collapsed state; and,
   wherein said cover is maintained along a rear portion of said tubular frame while at a deployed state.

2. The collapsible stroller assembly of claim 1, wherein said tubular frame comprises:
   a plurality of vertices about which said tubular frame is pivoted when adapted to said collapsed state, said vertices being oppositely situated on lateral sides of said tubular frame.

3. The collapsible stroller assembly of claim 1, wherein said tubular frame further comprises:
   a telescoping push handle; and,
   a plurality of locking mechanisms coupled to opposed ends of said tubular frame and situated adjacent to said telescoping push handle;
   wherein said locking mechanisms maintain said telescoping push handle at retracted and extended positions when said tubular frame is at said collapsed and deployed states respectively.

4. The collapsible stroller assembly of claim 1, wherein said cover has an exposed open rear surface after said cover is wrapped around said tubular frame, said cover flap being removably positioned over said open rear surface for shielding said tubular frame from ambient surroundings during transport.

5. The collapsible stroller assembly of claim 1, wherein said cover comprises:
   a pair of shoulder straps statically mated to upper and lower regions thereof, said shoulder straps being positioned along a forward facing portion of said cover.

6. The collapsible stroller assembly of claim 1, wherein said tubular frame further comprises: a lower rail assembly comprising:
   a lower rail portion; and,
   a lower rail stiffener having a pair of centrally-located hinges being pivotal to form a straight member;
   wherein said lower rail portion cooperates with said lower rail stiffener to laterally lock opposite sides of said tubular frame at said deployed state.

7. The collapsible stroller assembly of claim 2, wherein said tubular frame further comprises: an upper rail assembly comprising:
   an upper rail portion; and,
   an upper rail stiffener having a pair of centrally-located hinges being pivotal to form a straight member;
   wherein said upper rail portion cooperates with said upper rail stiffener to laterally lock opposite sides of said tubular frame at said deployed state; and,
   wherein said upper rail portion is attached to said vertices and centrally located therebetween.

8. A collapsible stroller assembly for being easily collapsed and supported on a user back during transport, said collapsible stroller assembly comprising:
   a collapsible tubular frame suitably sized and shaped for receiving and supporting a passenger thereon;
   a flexible cover attached to a rear of said tubular frame; and,
   a cover flap pivotally coupled to said cover and being removably situated over said tubular frame while at a collapsed state such that said tubular frame is completely intercalated between said cover and said cover flap during transport;
   wherein said cover is deployed in a forward direction around said tubular frame while at the collapsed state;
   wherein said cover is maintained along a rear portion of said tubular frame while at a deployed state; and,
   wherein said tubular frame, said cover and said cover flap are simultaneously supported on the user back during transport.

9. The collapsible stroller assembly of claim 8, wherein said tubular frame comprises:
   a plurality of vertices about which said tubular frame is pivoted when adapted to said collapsed state, said vertices being oppositely situated on lateral sides of said tubular frame.

10. The collapsible stroller assembly of claim 8, wherein said tubular frame further comprises:
   a telescoping push handle; and,
   a plurality of locking mechanisms coupled to opposed ends of said tubular frame and situated adjacent to said telescoping push handle;
   wherein said locking mechanisms maintain said telescoping push handle at retracted and extended positions when said tubular frame is at said collapsed and deployed states respectively.

11. The collapsible stroller assembly of claim 8, wherein said cover has an exposed open rear surface after said cover is wrapped around said tubular frame, said cover flap being removably positioned over said open rear surface for shielding said tubular frame from ambient surroundings during transport.

12. The collapsible stroller assembly of claim 8, wherein said cover comprises:
   a pair of shoulder straps statically mated to upper and lower regions thereof, said shoulder straps being positioned along a forward facing portion of said cover.

13. The collapsible stroller assembly of claim 8, wherein said tubular frame further comprises: a lower rail assembly comprising:
   a lower rail portion; and,
   a lower rail stiffener having a pair of centrally-located hinges being pivotal to form a straight member;
   wherein said lower rail portion cooperates with said lower rail stiffener to laterally lock opposite sides of said tubular frame at said deployed state.

14. The collapsible stroller assembly of claim 9, wherein said tubular frame further comprises: an upper rail assembly comprising:
   an upper rail portion; and,
   an upper rail stiffener having a pair of centrally-located hinges being pivotal to form a straight member;
   wherein said upper rail portion cooperates with said upper rail stiffener to laterally lock opposite sides of said tubular frame at said deployed state; and,
   wherein said upper rail portion is attached to said vertices and centrally located therebetween.

15. The method of utilizing a collapsible stroller assembly for being easily collapsed and supported on a user back during transport, said method comprising the step of:
   acquiring a collapsible stroller assembly comprising a collapsible tubular frame and a cover attached thereto, said cover being provided with a cover flap and shoulder straps pivotally attached thereto respectively;
   adapting said tubular frame to a collapsed state;
   wrapping said cover about said collapsed tubular frame;
   fastening said cover flap to said cover such that said collapsed tubular frame is completely housed inside said cover;
   positioning said shoulder straps over user shoulders such that a weight of said collapsible tubular frame is supported on the user back; and,
   carrying said collapsed tubular frame as a normal backpack.

16. The method of claim 15, further comprising the steps of:
   positioning said cover and said tubular frame on a ground surface;
   separating said cover flap from said cover;
   removing said tubular frame from said cover;
   positioning and securing said cover to a rear area of said tubular frame;
   adjusting said tubular frame to a deployed state; and,
   utilizing said stroller assembly as needed.

\* \* \* \* \*